(12) United States Patent
Bruchmann et al.

(10) Patent No.: US 6,632,914 B2
(45) Date of Patent: Oct. 14, 2003

(54) POLYFUNCTIONAL POLYISOCYANATE POLYADDUCTS

(75) Inventors: Bernd Bruchmann, Freinsheim (DE); Konrad Stiefenhöfer, Ebertsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 135 days.

(21) Appl. No.: 09/886,922

(22) Filed: Jun. 21, 2001

(65) Prior Publication Data

US 2003/0114629 A1 Jun. 19, 2003

(30) Foreign Application Priority Data

Jun. 23, 2000 (DE) .......................................... 100 30 869

(51) Int. Cl.⁷ .............................................. C08G 18/10
(52) U.S. Cl. ............................. 528/59; 528/60; 528/85; 525/457
(58) Field of Search .............................. 528/85, 59, 60; 525/457

(56) References Cited

U.S. PATENT DOCUMENTS

| 5,981,684 A | 11/1999 | Bruchmann et al. |
| 6,376,637 B1 | 4/2002 | Bruchmann et al. |
| 6,465,596 B1 | 10/2002 | Bruchmann et al. |

FOREIGN PATENT DOCUMENTS

| DE | 19524045 | 1/1997 |
| EP | 1026185 | 8/2000 |
| EP | 1054030 | 11/2000 |
| WO | WO97/02304 | 1/1997 |
| WO | WO98/52995 | 11/1998 |

OTHER PUBLICATIONS

Becker/Braun, Kunststoff–Handbuch, vol. 7, Polyurethane, Hanser–Verlag 1993.
EPO Search Report Dated Oct. 2, 2001.
Translation of EPO Search Report Dated Oct. 2, 2001.

*Primary Examiner*—Rachel Gorr
(74) *Attorney, Agent, or Firm*—Fernando Borrego

(57) ABSTRACT

Polyfunctional polyisocyanate polyadducts are prepared by a process comprising
  (i) preparation of an adduct by reacting
     (a) an at least trifunctional component (a1) reactive with isocyanate groups or a difunctional component (a2) reactive with isocyanate groups or a mixture of the components (a1) and (a2) with
     (b) a di- or polyisocyanate, the reaction ratio being chosen so that on average the polyadduct (A) contains one isocyanate group and more than one group reactive with isocyanate groups,
  (ii) if required, intermolecular addition reaction of the adduct (A) to give a polyadduct (P) which contains on average one isocyanate group and more than two groups reactive with isocyanate groups, and
  (iii) reaction of the adduct (A) or of the polyadduct (P) with an at least difunctional component (c) reactive with isocyanate groups.

10 Claims, No Drawings

POLYFUNCTIONAL POLYISOCYANATE POLYADDUCTS

The present invention relates to polyfunctional polyisocyanate polyadducts, preferably polyurethanes and polyurethaneureas, having a specific composition and based on di- or polyisocyanates and components reactive with isocyanate groups, and to a process for their preparation. The novel polyfunctional polyisocyanate polyadducts are preferably predominantly OH-terminated and can be advantageously used industrially, inter alia, as building blocks for polyurethane preparation, for example for the preparation of finishes, coatings, adhesives, sealing compounds, casting elastomers or foams.

Products which are composed of relatively high molecular weight di- or trifunctional polyetherols or polyesterols and less than stoichiometric amounts of di- or polyisocyanates are known in the area of polyurethane polyols. Comparatively nonuniform, generally linear polyurethane polyols having high viscosities and functionalities of from 2 to 4 result. In this context, also see Becker/Braun, Kunststoff-Handbuch, Vol. 7, Polyurethane, Hanser-Verlag 1993.

WO 97/02304 describes the preparation of polyfunctional polyurethane polyols by synthesis of dendritic and hyperbranched structures by means of special protective group techniques. WO 98/52995 describes dendrimeric, highly defined polyurethanepolyols which can be prepared by means of a shell-like (generation by generation) synthesis by using isocyanates having a primary and a tertiary NCO group and dialkanolamines. However, the products are very expensive owing to the many reaction steps and the special components not obtainable industrially.

It is an object of the present invention to provide, by means of a simple process, polyfunctional polyisocyanate polyadducts whose structures can be readily adapted to the requirements of use and which, owing to their defined composition, are capable of combining advantageous properties, such as high functionality, high reactivity, low viscosity and good solubility, and a process for the preparation of these polyfunctional polyisocyanate polyadducts.

It is a further object of the present invention to provide a process which makes it possible substantially to increase the functionality of commercial, industrial di- or polyols, di- or polyamines or aminoalcohols by reaction and, if required, also to modify them with respect to the type of functional group.

We have found that these objects are achieved, according to the invention, by reacting an adduct (A) or a polyadduct (P), which is obtainable by reacting an at least trifunctional component (a1) reactive with isocyanate groups, if required as a mixture with a difunctional component (a2) reactive with isocyanate groups, with a di- or polyisocyanate (b) and has an isocyanate group and on average more than one group reactive with isocyanate, with a further component (c) reactive with isocyanate groups to give the novel, polyfunctional polyisocyanate polyadduct having a specific composition.

The present invention thus relates to a process for the preparation of polyfunctional polyisocyanate polyadducts, comprising (i) preparation of an adduct (A) by reacting
 (a) an at least trifunctional component (a1) reactive with isocyanate groups or a difunctional component (a2) reactive with isocyanate groups or a mixture of the components (a1) and (a2) with
 (b) a di- or polyisocyanate, the reaction ratio being chosen so that on average the adduct (A) contains one isocyanate group and more than one group reactive with isocyanate groups,
(ii) if required, intermolecular addition reaction of the adduct (A) to give a polyadduct (P) which contains on average one isocyanate group and more than two groups reactive with isocyanate groups, and
(iii) reaction of the adduct (A) or of the polyadduct (P) with an at least difunctional component (c) reactive with isocyanate groups.

In a preferred embodiment, at least one of the components (a) and (b) has functional groups having a reactivity differing from that of the functional groups of the other component.

The present invention furthermore relates to the polyfunctional polyisocyanate polyadducts prepared by this process.

The present invention also relates to the use of the novel polyfunctional polyisocyanate polyadducts as building blocks for the production of finishes, coverings, adhesives, sealing compounds, casting elastomers or foams, and to the preparation of polyadducts or polycondensates obtainable using the novel polyfunctional polyisocyanate polyadducts.

In the context of this invention, the polyfunctional polyisocyanate polyadduct is to be understood as meaning a product which on average has more than two, preferably at least three, more preferably at least four, even more preferably at least six, particularly preferably at least ten, free OH, NH, SH or COOH groups, if desired also as a mixture. There is in principle no upper limit to the number of functional groups but products having a very large number of functional groups may have undesirable properties, for example high viscosity or poor solubility. The polyfunctional polyisocyanate polyadducts of the present invention generally have not more than 100, preferably not more than 50, functional groups. In a preferred embodiment, the novel polyfunctional polyisocyanate polyadducts are polyfunctional polyurethanes or polyurethaneureas.

The components (a) used in the preparation of the adduct (A) and reactive with isocyanate groups are selected from compounds which carry at least two groups reactive with isocyanate groups. Here, products having hydroxyl, mercapto, acid and/or amino groups are preferred.

Compounds which have at least two groups reactive with isocyanate and whose reactive groups are selected from the abovementioned functional groups or mixtures thereof and which functional groups have a different reactivity with respect to NCO groups can also be particularly preferably used for the preparation of the adduct (A). Compounds having at least one primary and at least one secondary or tertiary hydroxyl group, at least one hydroxyl group and at least one mercapto group, at least one hydroxyl group and at least one acid group or at least one hydroxyl group and at least one amino group in the molecule are preferred.

Compounds which are reactive with isocyanate and whose functional groups are reactive with isocyanate initially at the same reactivity but in which a decrease in reactivity due to steric or electronic influences can be induced in the remaining groups reactive with isocyanate by addition of at least one isocyanate are furthermore preferred. This is the case, for example, for the use of trimethylolpropane or pentaerythritol as component (a). Examples of compounds (a) having more than two groups reactive with isocyanate groups are glycerol, trimethylolmethane, trimethylolethane, trimethylolpropane, 1,2,4-butanetriol, 2-amino-1,3-propanediol, 2-amino-2-methyl-1,3-propanediol, diethanolamine, triethanolamine, dipropanolamine, tripropanolamine, diisopropanolamine, triisopropanolamine, ethanolpropanolamine, tris(hydroxymethyl)aminomethane, tris(hydroxyethyl)aminomethane, bis(aminoethyl)amine, bis(aminopropyl)amine, tris(aminoethyl)amine, tris(aminopropyl)amine, trisaminononane, melamine, dimethylolpropionic acid, dimethylolbutyric acid, glycerylcarboxylic acid, serine, tartaric acid, pentaerythritol, bis(trimethyrolpropane) or sugars, for example glucose, tri- or tetrafunctional polyetherols or polyesterols. Glycerol, trimethylolethane, trimethylolpropane, 1,2,4-butanetriol, pentaerythritol, diethanolamine, dipropanolamine, diisopropanolamine, tris(hydroxymethyl) aminomethane, tris(hydroxyethyl)aminomethane and dimethylolpropionic acid are particularly preferred.

Examples of compounds (a) having two groups reactive with isocyanate groups are ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, glyceryl monostearate, glyceryl monooleate, propane-1,2-dithiol, butane-1,2-dithiol, mercaptoethanol, mercaptopropanol, mercaptobutanol, ethylenediamine, propylenediamine, butylenediamine, hexamethylenediamine, toluylenediamine, isophoronediamine, cysteamine, ethanolamine, N-methylethanolamine, propanolamine, isopropanolamine, N-methyldiethanolamine, N-butyldiethanolamine, N-phenyldiethanolamine, N-methyldipropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, aminopropanethiol or difunctional polyetherols or polyesterols. Ethylene glycol, 1,2-propanediol, 1,2- and 1,3-butanediol, ethanolamine, propanolamine, mercaptoethanol, N-methyldiethanolamine, 4-hydroxypiperidine and 1-hydroxyethylpiperazine are particularly preferred.

Furthermore, mixtures of said compounds may also be used.

Suitable di- and polyisocyanates (b) are the aliphatic, cycloaliphatic and aromatic isocyanates known from the prior art. Preferred di- or polyisocyanates are diphenylmethane 4,4'-diisocyanate, the mixtures of monomeric diphenylmethane diisocyanates and oligomeric diphenylmethane diisocyanates (polymer MDI), tetramethylene diisocyanate, hexamethylene diisocyanate, methylenebiscyclohexyl 4,4'-diisocyanate, xylylene diisocyanate, tetramethylxylylene diisocyanate, dodecyl diisocyanate, lysine alkyl ester diisocyanate, where alkyl is $C_1$ to $C_{10}$, 2,2,4- or 2,4,4-trimethylhexamethylene 1,6-diisocyanate, 1,4-diisocyanatocyclohexane or 4-isocyanatomethyl octamethylene 1,8-diisocyanate.

Di- or polyisocyanates (b) having NCO groups of different reactivity, such as tolylene 2,4-diisocyanate (2,4-TDI), diphenylmethane 2,4'-diisocyanate (2,4'-MDI), triisocyanatotoluene, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, methylenebiscyclohexyl 2,4'-diisocyanate and 4-methylcyclohexane 1,3-diisocyanate (HTDI) are particularly preferred.

Further particularly preferred isocyanates (b) are those whose NCO groups initially have the same reactivity but in which a decrease in reactivity can be induced in the case of the second NCO group by first addition of an alcohol or of an amine at an NCO group. Examples of these are isocyanates whose NCO groups are coupled via a delocalized electron system, e.g. phenylene 1,3- and 1,4-diisocyanate, naphthylene 1,5-diisocyanate, diphenyl diisocyanate, toluidine diisocyanate or tolylene 2,6-diisocyanate.

It is also possible to use, for example, oligo- or polyisocyanates which can be prepared from said di- or polyisocyanates or mixtures thereof by linkage by means of urethane, allophanate, urea, biuret, uretdione, amide, isocyanurate, carbodiimide, uretonimine, oxadiazinetrione or iminooxadiazinedione structures.

In the preparation of the adduct (A), it is necessary to establish the reaction ratio of the components (a) having groups reactive with isocyanate to the di- or polyisocyanate (b) so the resulting adduct (A) contains on average only one NCO group and more than one group reactive with isocyanate.

For example, in the preparation of the adduct (A) from a diisocyanate and a dihydric alcohol, the molar ratio used is 1:1, illustrated by the formula 1

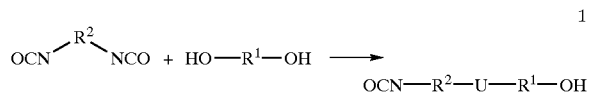

1 in the preparation of the adduct (A) from a diisocyanate and a trihydric alcohol, the molar ratio used is 1:1, illustrated by the formula 2

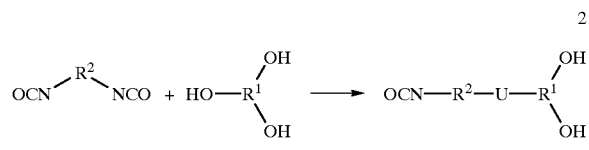

2 and in the preparation of the adduct (A), from a diisocyanate and a tetrahydric alcohol, the molar ratio used is likewise 1:1, illustrated by the formula 3

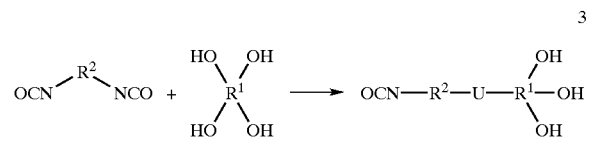

3 where, in the formulae 1 to 3, $R^1$ and $R^2$ are each an organic radical and U is a urethane group.

Furthermore, the preparation of the adduct (A) can also be carried out, for example, from a triisocyanate and a dihydric component (a) reactive with isocyanate, illustrated by the formula 4, where the molar ratio used is 1:2, $R^1$ and $R^2$ have the same meaning as in the formulae 1 to 3 and Y is a urea group.

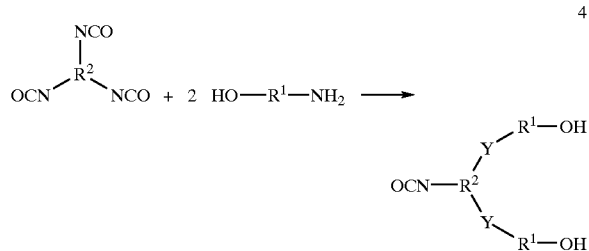

4

If compounds from (a2) having two groups reactive with isocyanate groups are also added to the component (a1), this results in an extension of the chains. As illustrated, for example, in the formula 5, a further mole of component (b) must be added to each mole of component (a2).

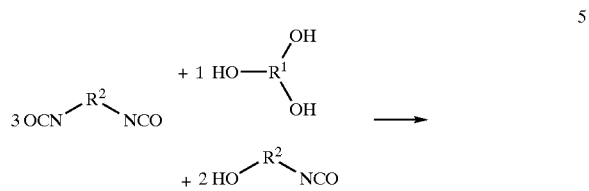

5

-continued

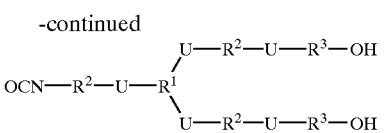

In formula 5, $R^3$ is an organic radical and $R^1$, $R^2$ and U are defined as described above.

The reaction to give the adduct (A) is usually carried out at from −20 to 120° C., preferably from −10 to 100° C. In a preferred embodiment, the isocyanate component (b) is initially taken and the component (a) is added. The adducts (A) are usually not stable over a longer period and are therefore preferably reacted directly with the component (c) reactive with isocyanate groups.

In a preferred embodiment, the adduct (A) can be converted into a polyadduct (P) by an intermolecular addition reaction of the adduct (A). Here, the groups of the adduct (A) which are reactive with isocyanate undergo addition at one isocyanate group of a further adduct (A). The number of adducts (A) which undergo addition reactions to give a polyadduct (P) is in general not restricted. From practical points of view, the addition reaction is usually terminated before the polyadduct (P) has disadvantageous properties, for example too high a viscosity or too poor a solubility, for example owing to too high a molecular weight or for steric reasons.

Because of the characteristics of the adducts (A) it is possible that the addition reaction may give rise to different polyadducts (P) which are branched but not crosslinked. Furthermore, the polyadducts (P) have an isocyanate group and more than two groups reactive with isocyanate groups. The number of groups reactive with isocyanate groups arises out of the characteristics of the adducts (A) used and the degree of polyaddition.

For example, an adduct (A) according to the formula 2 can react by triple intermolecular addition to give two different polyadducts (P), which is shown in the formulae 6 and 7.

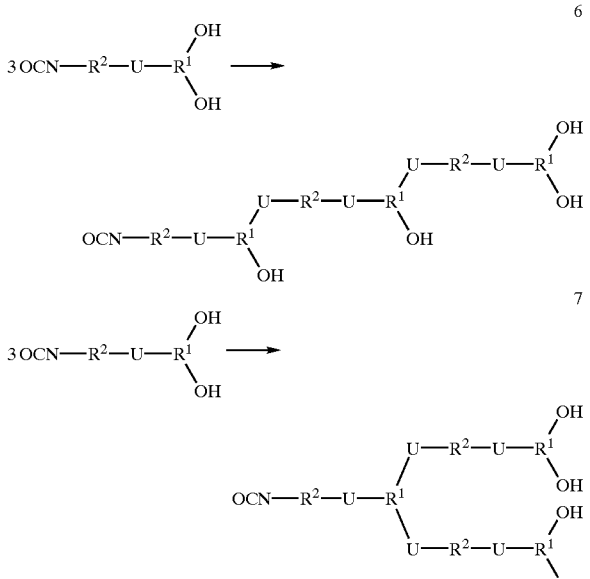

In formulae 6 and 7, $R^1$, $R^2$ and U are defined as above.

Intermolecular polyaddition reaction of an adduct (A) to give a polyadduct (P.) can usually be carried out in situ by a temperature increase after the end of the reaction to give the adduct (A).

Furthermore, a suitable catalyst or a suitable catalyst mixture may also be added. Suitable catalysts are in general compounds which catalyze urethane reactions, for example amines or ammonium compounds, organoaluminum, organotin, organotitanium, organozirconium or organobismuth compounds.

Examples are diazabicyclooctane (DABCO), diazabicyclononene (DBN) and diazabicycloundecene (DBU), titanium tetrabutylate, dibutyltin dilaurate, zirconium acetylacetonate or mixtures thereof.

The catalyst is added in general in an amount of from 50 to 10000, preferably from 100 to 5000, ppm by weight, based on the amount of isocyanate used.

Furthermore, it is also possible to control the intermolecular polyaddition reaction both by adding a suitable catalyst and by choosing a suitable temperature.

There are various possibilities for terminating the intermolecular polyaddition reaction. For example, the temperature can be decreased to a range in which the addition reaction stops and the adduct (A) or the polyadduct (P) is storage-stable.

In a preferred embodiment, an at least difunctional component (c) reactive with isocyanate groups is added to the polyadduct (P) for terminating the polyaddition reaction, as soon as a polyadduct (P) having the desired degree of polyaddition is present as a result of the intermolecular addition reaction of the adduct (A). By reacting the polyadduct (P) with the component (c), the novel polyfunctional polyisocyanate polyadducts are obtained.

If, for example, a diamine is added as component (c) in the ratio 2:1 to a polyadduct (P) of the formula 6, a novel polyfunctional polyisocyanate-polyadduct, in this case a polyurethanepolyol, of the formula 8 is obtainable.

In formula 8, $R^1$, $R^2$, Y and U are defined as above and $R^4$ is an organic radical which is preferably not identical to $R^1$.

Alternatively, the at least difunctional component (c) reactive with isocyanate groups can also be added to an adduct (A) which has not yet been subjected to an intermolecular addition reaction to give a polyadduct (P).

However, it is generally technically advantageous to carry out the intermolecular addition reaction at least to a small extent, since small amounts of di- or polyisocyanate (b) may also be present as impurities in the adduct (A), these impurities can then also be incorporated into the polyadduct (P) by the intermolecular polyaddition reaction.

In the reaction of the adduct (A) or of the polyadduct (P) with the at least difunctional component (c) reactive with isocyanate groups, usually at least one group which is reactive with isocyanate and belongs to the component (c) is reacted with the isocyanate group of the adduct (A) or of the polyadduct (P). In a preferred embodiment, from 40 to 100% of the free groups of component (c) which are reactive with isocyanate are reacted with a corresponding number of equivalents of an adduct (A) or polyadduct (P) to give the novel polyfunctional polyurethane.

In a further embodiment, first a group which is reactive with isocyanate groups and belongs to the component (c) is reacted with an adduct (A1) or a polyadduct (P1) and then at least one further group which is reactive with isocyanate groups and belongs to the component (c) is reacted with an adduct (A2) or a polyadduct (P2), the adducts (A1) and (A2) and the polyadducts (P1) and (P2) not being identical. For this embodiment, di- or polyols, di- or polyamines or aminoalcohols which have groups reactive with isocyanate groups and having different reactivities with respect to the isocyanate groups of the components (A) and (P) are preferably used as components (c).

The preparation of the novel polyfunctional polyisocyanate polyadducts is generally effected in solvents. In general, it is possible to use all solvents which are inert toward the respective starting materials. Organic solvents, for example diethyl ether, tetrahydrofuran, dioxane, acetone, 2-butanone, methyl isobutyl ketone, ethyl acetate, butyl acetate, benzene, toluene, chlorobenzene, xylene, methoxyethyl acetate, methoxypropyl acetate, dimethylformamide, dimethylacetamide, N-methylpyrrolidone and solvent naphtha, are preferably used.

The preparation of the novel polyfunctional polyisocyanate polyadducts is generally effected at from 2 mbar to 20 bar, preferably at atmospheric pressure, in reactors or reactor cascades which are operated batchwise, semicontinuously or continuously.

The novel products can be further processed after the preparation without further purification by establishing the reaction conditions as stated above and, if required, by the choice of a suitable solvent.

The polyfunctional polyisocyanate polyadducts obtained by the novel process can, if required, also be rendered hydrophobic or hydrophilic or changed with respect to their functional groups. For this purpose, the OH-, SH- or NH-terminated products can be reacted or partially reacted, for example, with saturated or unsaturated carboxylic acids or their derivatives reactive toward OH, SH or NH groups, sulfonic acids or their derivatives reactive toward OH, SH or NH groups or isocyanate-containing compounds. If the novel polyadducts contain acid groups or tertiary amino groups they can be rendered water-soluble, for example, by acid/base reactions.

A further advantage of the present invention is that the functionalities of conventional, industrial alcohols, thioalcohols, amines or aminoalcohols can be substantially increased. If, for example, a commercial polyetherpolyol having an average OH functionality of 3 is reacted with an adduct (A) of one mole of diisocyanate and one mole of tris(hydroxymethyl)-aminomethane, the average functionality of the resulting polyurethanepolyol will be 9.

An advantage of the novel polyurethanes having higher functionality is that, when they are used, for example for producing a polyurethane network, the network is not produced, as usual, randomly from polyol and polyisocyanate but structures having a defined sequence of molecules and previously defined properties are incorporated into the network.

A further advantage of the novel process is its cost-efficiency. Both the reaction to give an adduct (A) or polyadduct (P) and the reaction of (A) or (P) to give a polyfunctional polyurethane can be effected in one reaction apparatus which is technically and economically advantageous.

We claim:
1. A process for the preparation of polyfunctional polyisocyanate polyadducts, comprising
   (i) preparation of an adduct (A) by reacting
      (a) an at least trifunctional component (a1) reactive with isocyanate groups or a difunctional component (a2) reactive with isocyanate groups or a mixture of the components (a1) and (a2) with
      (b) a di- or polyisocyanate component, the reaction ratio being chosen so that on average the adduct (A) contains one isocyanate group and more than one group reactive with isocyanate groups,
   (ii) optionally, intermolecular addition reaction of the adduct (A) to give a polyadduct (P) which contains on average one isocyanate group and more than two groups reactive with isocyanate groups, and
   (iii) reaction of the adduct (A) or of the polyadduct (P) with an at least difunctional component (c) reactive with isocyanate groups.

2. A process as claimed in claim 1, wherein the component (c) reactive with isocyanate groups and the components (a1) and (a2) reactive with isocyanate groups are different.

3. A process as claimed in claim 1, wherein at least one of the components (a) and (b) has functional groups having a reactivity which differs with respect to the functional groups of the other component.

4. A process as claimed in claim 1, wherein the groups reactive with isocyanate groups and belonging to the components (a1), (a2), and (c) are selected from the group consisting of hydroxyl groups, mercapto groups, amino groups, carboxyl groups and mixtures thereof.

5. A process as claimed in claim 1, wherein the di- or polyisocyanate (b) contains compounds having on average two to four isocyanate groups per molecule or mixtures thereof.

6. A process as claimed in claim 1, wherein, in the reaction of the adduct (A) or the polyadduct (P) with the component (c) reactive with isocyanate groups, the ratio of isocyanate-reactive groups of the compound (c) to the isocyanate groups of the adduct (A) or of the polyadduct (P) is chosen so that at least 10% of the isocyanate-reactive groups of the compound (c) are reacted.

7. A process as claimed in claim 1, wherein component (a1) comprises glycerol, trimethylolpropane, pentaerythritol, diethanolamine, dipropanolamine, diisopropanolamine, tris(hydroxymethyl)aminomethane or dimethylolpropionic acid, component (a2) comprises ethylene glycol, butanediol, hexanediol, mercaptoethanol, ethanolamine, propanolamine, butanolamine or N-methyldiethanolamine, and component (c) comprises ethylene glycol, butanediol, hexanediol, glycerol, trimethylolpropane, pentaerythritol, tris(hydroxymethyl)aminomethane, ammonia, hexamethylenediamine, isocphoronediamine, tris(aminoethyl)amine, triaminononane, melamine, triethanolamine, tris(aminoethyl)amine, polyethyeleimine or polyvinylamine.

8. A polyfunctional polyisocyanate polyadduct prepared according to the process as claimed in claim 1.

9. A polyfunctional polyisocyanate polyadduct prepared according to the process as claimed in claim 1, wherein the molecule has both aliphatically and aromatically bonded groups reactive with isocyanate.

10. A process as claimed in claim 1, wherein, in the reaction of the adduct (A) or the polyadduct (P) with the component (c) reactive with isocyanate groups, the ratio of isocyanate-reactive groups of the compound (c) to the isocyanate groups of the adduct (A) or of the polyadduct (P) so that at least 40% of the isocyanate-reactive groups of the compound (c) are reacted.

* * * * *